US007398469B2

(12) United States Patent
Kisamore et al.

(10) Patent No.: US 7,398,469 B2
(45) Date of Patent: Jul. 8, 2008

(54) AUTOMATED TEST SYSTEM FOR TESTING AN APPLICATION RUNNING IN A WINDOWS-BASED ENVIRONMENT AND RELATED METHODS

(75) Inventors: Michael T. Kisamore, Stewartstown, PA (US); Donald L. Emmel, Stewartstown, PA (US)

(73) Assignee: United Parcel of America, Inc., Atlanta, GA (US)

( * ) Notice: Subject to any disclaimer, the term of this patent is extended or adjusted under 35 U.S.C. 154(b) by 615 days.

(21) Appl. No.: 10/799,904

(22) Filed: Mar. 12, 2004

(65) Prior Publication Data

US 2005/0204343 A1 Sep. 15, 2005

(51) Int. Cl.
*G06F 3/00* (2006.01)
(52) U.S. Cl. .................. 715/704; 715/700; 715/763; 715/967; 717/124
(58) Field of Classification Search ............... 715/700, 715/764, 751, 753, 755, 756, 757, 758, 704, 715/763; 345/156, 300; 719/328, 329; 717/124
See application file for complete search history.

(56) References Cited

U.S. PATENT DOCUMENTS

| 5,475,843 | A | * | 12/1995 | Halviatti et al. ............. 717/124 |
| 5,499,359 | A | * | 3/1996 | Vijaykumar ................. 707/201 |
| 5,600,789 | A | * | 2/1997 | Parker et al. ................. 714/38 |
| 5,634,098 | A | * | 5/1997 | Janniro et al. ................ 714/38 |
| 5,781,720 | A | | 7/1998 | Parker et al. |
| 6,046,740 | A | | 4/2000 | LaRoche et al. |
| 6,182,246 | B1 | | 1/2001 | Gregory et al. |
| 6,263,457 | B1 | | 7/2001 | Anderson et al. |
| 2002/0126672 | A1 | | 9/2002 | Chow et al. |
| 2003/0052917 | A1 | * | 3/2003 | Dubovsky ................... 345/764 |
| 2003/0208542 | A1 | | 11/2003 | Deming et al. |

FOREIGN PATENT DOCUMENTS

| DE | 2299113 | 2/2000 |
| WO | WO 01/33360 A1 | 5/2001 |
| WO | WO 01/71502 A1 | 9/2001 |

OTHER PUBLICATIONS

International Search Report from corresponding International Application No. PCT/US04/035071 dated Oct. 22. 2004.
International Search Report from corresponding International Application No. PCT/US2004/035071 dated Jun. 19, 2006.

* cited by examiner

*Primary Examiner*—Sy D. Luu
*Assistant Examiner*—Meseker Takele
(74) *Attorney, Agent, or Firm*—Alston & Bird LLP

(57) ABSTRACT

Methods and systems disclosed herein can be used for testing an application's rendering of output to individual controls of a Graphical User Interface (GUI), displayed on a target device executing the application. A system according to the present invention includes a test tool running on a development computer that communicates with an agent executing on the target device. Testing is performed by using the test tool to execute test scripts, which cause test input to be injected via the agent into the application on the target device. The test tool can validate whether actual output on the target device matches expected output known to the test tool. The present invention includes a variety of key components, such as a flexible trap manager for handling unexpected screens that appear during an automated test, and a configuration manger for testing against multiple languages and platform configurations.

9 Claims, 11 Drawing Sheets

| CONFIG | GLOBAL | COUNTRY | LANGUAGE | DIAD |
|---|---|---|---|---|
| FR2 | STANDARD | FR | fr_FR | D2 |
| FR3 | STANDARD | FR | fr_FR | D3 |
| GB2 | STANDARD | GB | en_GB | D2 |
| GB3 | STANDARD | GB | en_GB | D3 |
| IT2 | STANDARD | IT | it_IT | D2 |
| IT3 | STANDARD | IT | it_IT | D3 |
| US2 | STANDARD | US | en_US | D2 |
| US3 | STANDARD | US | en_US | D3 |

FIG. 4A

| VARIABLES | en_GB | en_US | fr_FR | it_IT |
|---|---|---|---|---|
| lanYES | Y | Y | O | S |
| lanNO | N | N | N | N |
| lanPUNCHOUT | S | P | A | F |
| lanVERIFY | V | V | V | V |
| lanDRIVER | D | D | C | V |
| lanHELPER | H | H | A | A |
| lanCUSTOMER | C | C | E | F |
| lanGEN | GEN | GEN | GEN | GEN |
| lanOCA | OCA | OCA | OCA | RTL |

FIG. 4B

| lanYES | Y |
|---|---|
| lanNO | N |
| lanPUNCHOUT | P |
| lanVERIFY | V |
| lanDRIVER | D |
| lanHELPER | H |
| lanCUSTOMER | C |
| lanGEN | GEN |
| lanOCA | OCA |

FIG. 4C

| ControlPath | CaptionText | ClassName | PositionX | PositionY | WindowStyle | FontSize | FontWeight | IdentifyFlag | VerifyFlag |
|---|---|---|---|---|---|---|---|---|---|
| DUP_LABEL | "" | Dialog | 0 | 20 | -1870659516 | 14 | 400 | | |
| DUP_LABEL.LABEL | "" | static | 71 | 20 | 1342177420 | 20 | 700 | 6144 | 514559 |
| DUP_LABEL.PKG_NUM | "" | static | 271 | 40 | 1342177420 | 20 | 700 | 6144 | 514559 |
| DUP_LABEL.TEXT1 | "The Following Label" | static | 80 | 0 | 1342177420 | 20 | 700 | | |
| DUP_LABEL.TEXT2 | "Currently exists for package-->" | static | 31 | 40 | 1342177420 | 20 | 700 | | |
| DUP_LABEL.TEXT3 | "This label may exist on only one" | static | 31 | 60 | 1342177420 | 20 | 700 | | |
| DUP_LABEL.TEXT4 | "package. Edit as necessary" | static | 31 | 80 | 1342177420 | 20 | 700 | | |
| DUP_LABEL.TEXT5 | "Press Any Key to Continue" | static | 56 | 100 | 1342177420 | 20 | 700 | | |

FIG. 6

84 ~ [edit]
    MappedClass=edit
    VerifyFlag=515583 — 88
    IdentifyFlag=7168 — 86

84 ~ [button]
    MappedClass=button
    VerifyFlag=516095 — 88
    IdentifyFlag=7680 — 86

84 ~ [dialog]
    MappedClass=dialog
    VerifyFlag=514047 — 88
    IdentifyFlag=5120 — 86

84 ~ [static]
    MappedClass=static
    VerifyFlag=516095 — 88
    IdentifyFlag=7680 — 86

84 ~ [listbox]
    MappedClass=listbox
    VerifyFlag=515583 — 88
    IdentifyFlag=3072 — 86

84 ~ [combobox]
    MappedClass=combobox
    VerifyFlag=515583 — 88
    IdentifyFlag=7168 — 86

84 ~ [scrollbar]
    MappedClass=scrollbar
    VerifyFlag=515583 — 88
    IdentifyFlag=7168 — 86

84 ~ [D4Edit]
    MappedClass=edit
    VerifyFlag=515583 — 88
    IdentifyFlag=6144 — 86

AUTOMATED TEST SYSTEM FOR TESTING AN APPLICATION RUNNING IN A WINDOWS-BASED ENVIRONMENT AND RELATED METHODS

FIELD OF THE INVENTION

The present invention relates generally to testing and validation of software applications, and more particularly, to systems and methods for performing testing and validation of an application's rendering of output to the individual controls and windows associated with a Graphical User Interface (GUI) displayed on a target device, which is executing the application under test in a Windows-based environment.

BACKGROUND OF THE INVENTION

Handheld portable electronic devices have proliferated in recent years. These devices range broadly in terms of the functionality they offer. For example, computing devices such as personal digital assistants (PDAs), communication devices such as cellular or wireless telephone handsets, information acquisition devices such as barcode or radio-frequency identification (RFID) scanners, personal entertainment devices such as digital versatile disc (DVD) players, compact disc (CD) players, and gaming systems, hybridized devices incorporating functionality of more than one of the above devices, and numerous other kinds of handheld devices, are now available on the market for a variety of purposes desired by users.

Such handheld computerized devices incorporate embedded operating systems such as Windows CE and Palm OS which provide some of the functions of larger operating systems, but are much more compact in terms of the memory required for their storage and execution, the processing power required to execute them, and the speed with which they can be executed by a processor within the handheld device. With the proliferation of handheld devices, so too of course have the number of such devices incorporating a Windows CE operating system. This circumstance has driven greater demand for software development tools that operate with these and other types of Windows-based devices. Although there are a number of software test tools currently on the market, no one system provides a complete suite of capabilities for easily and effectively testing all facets of an application's rendering of output to a graphical user interface (GUI), which is displayed on a target device executing an application under test.

For example, when a test developer creates a test script to run an automated test, the test developer typically expects the device's state to sequence in a certain order so that he or she can effectively test particular aspects of the application under evaluation. However, it is not uncommon to have unexpected screens pop up on the target device during an automated test. The occurrence of these unexpected screens, referred to herein as "trap events," can adversely impact the results of the automated test, even causing it to fail. The ability to handle the instantiation of such unexpected screens, message boxes or other such "trap events" can be an important aspect of conducting the unattended execution of an automated test. While some prior art systems provide some basic functionality for dealing with these unwanted screens, such as having the test tool push a single "close" button, they do not provide a user with the flexibility to deal with such screens in any manner that the user deems appropriate for a given test situation.

Another important aspect of automated testing and validation of software applications is the need to have a robust system for testing against multiple languages and platform configurations. Testing software applications has become increasingly complex due in part to the fact that many applications now run on several different platforms with different configurations, and in different languages. The ability to test international releases of software applications is of vital importance to most test groups. Yet, many prior art systems do not provide a robust and easy-to-use system for conveniently testing against international releases of an application, within the same automated test.

Yet another aspect not adequately addressed in the prior art is the need to have a flexible system for accurately "identifying" and "verifying" controls and windows on the target device. Suppose a test developer wants to make a call to get the text from a specific text box that is believed to be present on the target device. Before the test tool can "grab" the specific control, the test tool needs to find that control. Some prior art systems include a window recording utility that includes a list of properties which can be selected to uniquely identify that window. After setting these properties once per recording session, such tools use this set of properties when identifying that window, and all controls within that window. However, there are many instances in which a user may require the flexibility to identify (or verify) a particular control based on a different set of properties than other such controls within that same window or within the same control class type.

A need therefore exists for an improved system and method of testing and validating an application's rendering of output to a graphical user interface (GUI) in a Windows-based environment, which overcomes at least the deficiencies in the prior art that are discussed above.

BRIEF SUMMARY OF THE INVENTION

The present invention provides an automated software test system which, in its various embodiments, overcomes at least the deficiencies in previous test tools that are discussed above. A system in accordance with the present invention comprises a test tool running on a development computer (or PC) that communicates via a transmission medium with an agent executing on a target device. The target device also executes an application to be tested. In general, testing is performed by using the test tool on the development computer to execute a test script, which causes the development computer to generate a variety of test input to be injected via the agent into the application under test on the target device. The test tool is configured to validate whether actual output contained on the target device matches expected output stored in the test tool. In performing these functions, the test tool (via the agent) is able to send events to, and get information from, individual GUI controls, which are displayed on the target device.

One embodiment of the present invention is a system for testing an application running in a Windows CE operating environment, comprising a target device that stores and executes a software test agent, in which the application under test is also stored and executed on the target device. The system further comprises a test development computer that stores and executes a software test tool for testing and validating the application's rendering of output to a graphical user interface (GUI) on the target device. To carry out test operations, the test tool is configured to communicate with the agent on the target device via a transmission medium. The software test tool can perform an automated test by executing a test script designed to test one or more aspects of the application's rendering of output to the GUI. In doing so, the test tool is operable to generate requests to the agent to send events to and obtain information from individual controls associated with the GUI on the target device.

The system further comprises a trap manager for handling occurrences of unexpected screens (or "trap events") on the target device during execution of the test script. The trap manager is configured to allow a user to define a trap event and create an associated user-defined function for handling the trap event. The trap manger is further configured to automatically check whether the trap event has occurred during execution of the test script, and, upon detecting the trap event, execute the user-defined function that was designed to handle the trap event. In another embodiment, the system further comprises a configuration manager for handling testing of the application against multiple languages and platform configurations, in which the configuration manager comprises a configuration table that includes one or more configurations, each configuration comprising a collection of value sets, each value set comprising a collection of one or more related configuration items and corresponding values for those items.

Another embodiment of the present invention is a method of handling occurrence of an unexpected screen (or "trap event") during execution of an automated test of an application running on a target device, which comprises the steps of defining a trap event using a software test tool that is executing on a test development computer, and creating an associated user-defined function for handling the trap event. The method further comprises storing data associated with the trap event on the target device, and monitoring with the agent events on the target device to determine whether the trap event has occurred. Upon the occurrence of the trap event, the method can further comprise transmitting a notification of the occurrence of the trap event to the test tool. The notification includes a user-defined name for uniquely referring to the trap event which has occurred on the target device. The method further comprises, accessing a table on the development computer using the trap event name to obtain a pointer that points to the user-defined function for handling the trap event, and executing the user-defined function to handle the trap event.

Another embodiment of the present invention is a method of testing an application that is operable to execute in multiple languages and platform configurations. The method comprises storing a configuration table having a plurality of user-defined configurations, each configuration comprising a collection of value sets, and each value set comprising a collection of one or more related configuration items and associated values. The method further comprises writing a test script that executes differently based on which user-defined configuration is loaded from the configuration table, loading a user-defined configuration from the table prior to execution of the test script, and executing the test script.

Yet another embodiment of the present invention is a method of interrogating a particular GUI control that is associated with an application under test running on a target device, comprising: storing a screen definition table that includes a list of entries, which each contain information related to a particular GUI control associated with the application under test running on the target device; storing a class mapper table that includes a list of entries, which each contain information related to a particular class of GUI controls; locating in the screen definition table a user defined name of the control to be interrogated on the target device; and reading from the screen definition table a list of properties associated with the control to be interrogated.

The method can further comprise: checking to see whether a control-specific identify-flag data field associated with the control to be interrogated is empty; loading an identify flag from the control-specific identify flag data field, if the data field is not empty; loading a default identify flag from the class mapper table using the class name associated with the control to be interrogated, if the control-specific identify-flag field is empty; generating a request to the agent running on the target device to locate a control that matches the control to be interrogated, each control on the target device having a "handle" for accessing that control; and receiving a handle for a matching control from the agent on the target device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A shows a representative portion of an example configuration table which defines the value sets to load from each item group for each configuration, in accordance with the present invention.

FIG. 4B shows a representative portion of an example configuration table which defines the value sets that fall into a particular item group, in accordance with the present invention.

FIG. 4C shows an example of a particular value set that could be loaded with a given configuration, in accordance with the present invention.

FIG. 6 shows an example of the type of information found in a screen definition table, in accordance with the present invention.

FIG. 7 shows an example of the type of information found in a class mapper table, in accordance with the present invention.

FIG. 11 shows a screen shot of a user interface associated with the test tool, which currently displays several open log files.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
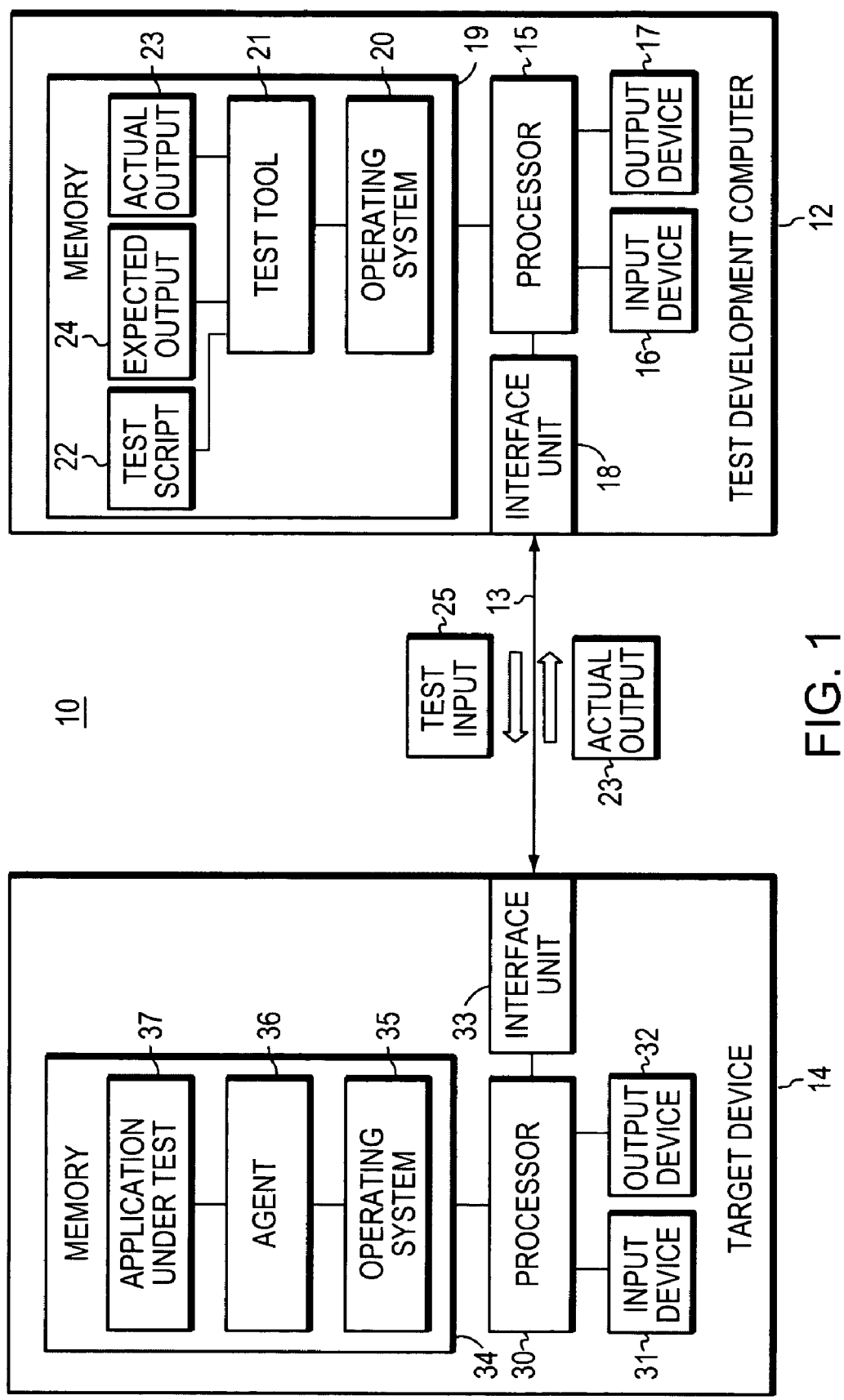
FIG. 1 shows a block diagram of an automated software test system, in accordance with the present invention.

FIG. 1 shows a block diagram of an automated software test system 10 in accordance with the present invention. The system 10 includes a test development computer 12 that is operable to communicate with a target device 14 via a transmission medium 13. The test development computer 12 includes a processor 15 that is connected to an input device 16, an output device 17, an interface unit 18, and memory 19. In addition to an operating system 20, the memory 19 on the development computer 12 includes a test tool 21 that can be executed by the development computer to test an application 37 running on the target device 14. The memory 19 further includes one or more test scripts 22 for running test scenarios that can be used by the test tool 21 to compare actual output 23, generated by an application 37 on the target device 14, to corresponding expected output 24.

In one embodiment, the target device 14 can be a hand-held device, such as a personal digital assistant (PDA), that runs using the Windows CE operating system. In another embodiment, the target device 14 can be a Windows PC (personal computer). The target device 14 includes a processor 30 that is connected to an input device 31, an output device 32, an interface unit 33, and memory 34. It will understood by those of ordinary skill in the art that the input device 31 and the output device 32 may in fact be a single device, such as touch-sensitive display screen, as is common with many mobile devices. In addition to an operating system 35, such as Windows CE, the memory 34 on the target device 14 includes an agent 36 and an application under test (AUT) 37. The agent 36 is operable to communicate with the test tool 21 to perform test operations related to the AUT 37, which need to occur on the target device 14. In this way, the automated test system 10 can be used to test the graphical user interface (GUI) associated with the application under test (AUT) 37 running on the target device 14. In general, testing is performed by using the test tool 21 to execute a test script 22, which injects test input 25—such as key strokes or timer events—into the AUT 37 via the agent 36. The test tool 21 via the agent 36 can then validate that actual output 23, which is displayed or stored on the target device 14, matches expected output 24 known to the test tool or a user of the test tool.

Communication between the development PC 12 and the target device 14 via the transmission medium 13 can occur in any known manner. In one embodiment, the development PC 12 communicates with the target device 14 via a transmission medium 13 such as an Ethernet connection using TCP/IP. Because this communication can occur over Ethernet, a single development computer 12 can be used to connect to several target devices 14, in a linear fashion, within a single test script 22. This allows a test script 22 to include such test actions as initiating a data transfer from one target device 14 to another, and then verifying that the results of such transfer match a set of expected results 24.

The agent 36 running on the target device 14 is configured to receive requests from the test tool 21 for information on the AUT 37 running on the target device. The agent can use standard Windows User Interface functions to find a requested window on the target device 14. Using a returned handle to the requested window, the agent 36 can communicate non-intrusively with the AUT 37 using the standard Windows Messaging System to either request information from the window or send events to the window. As used herein, a "handle" is any token that a program can use to identify and access an object such as a device, a file, a window, a dialog box, etc. Using the Windows Messaging System, the agent 36 is able to simulate user input to the GUI associated with the AUT 37. The agent 36 is also able to retrieve font data, class data, windows style data, caption text, etc. from the window or an associated child window or control. Using the information retrieved by the agent 36, and returned for analysis to the test tool 21, a test developer (using the test tool) is able to verify that the actual state 23 of the AUT 37 matches an expected state 24.

Figure 2:
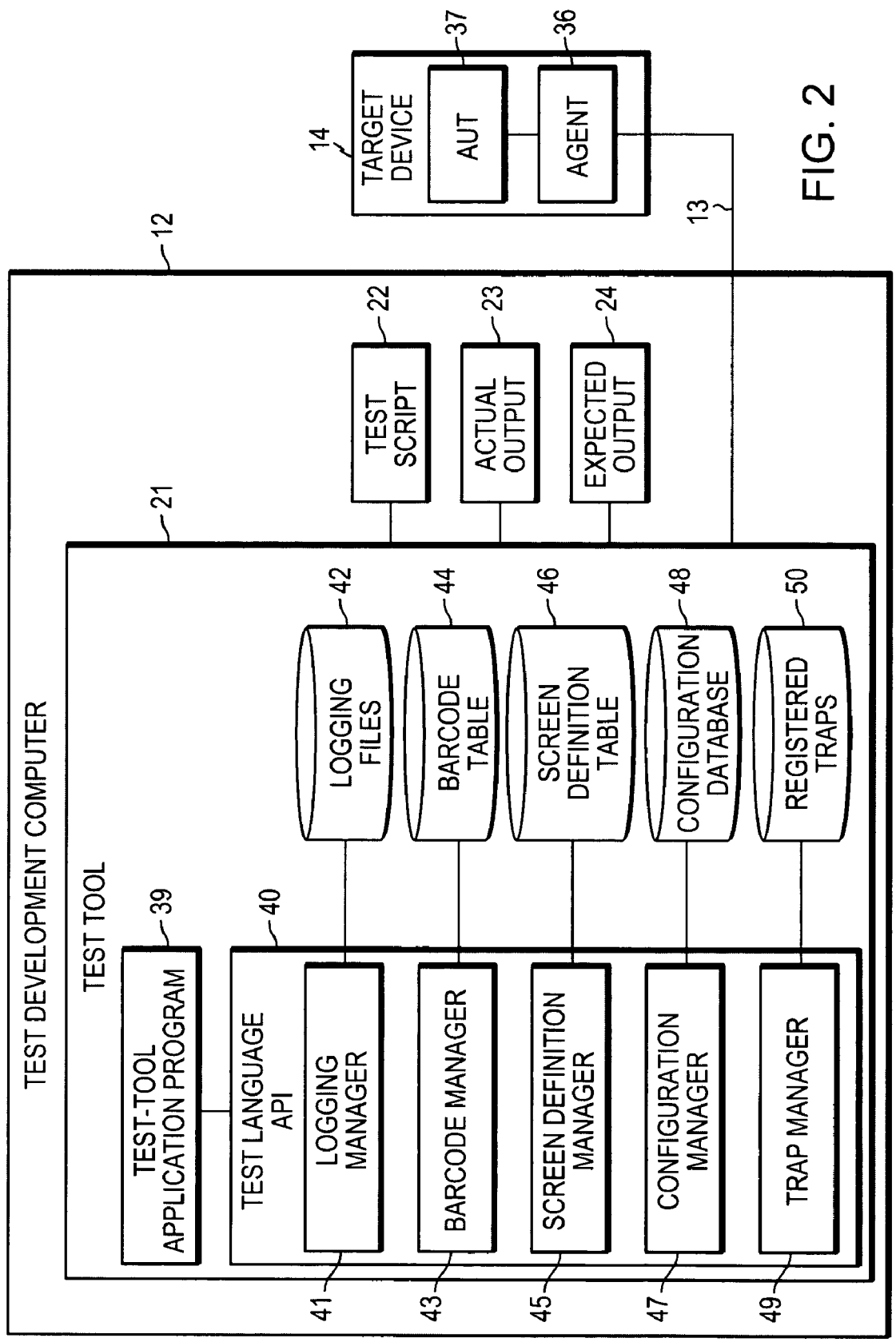
FIG. 2 shows a block diagram that illustrates in further detail aspects associated with the test tool portion of the automated test system of FIG. 1, in accordance with the present invention.

FIG. 2 shows a block diagram that illustrates in further detail aspects associated with the test tool portion 21 of the automated test system 10 of FIG. 1, in accordance with the present invention. The software test system 10 provides a mechanism for automating the testing and validation of a Windows application 37 running on a target device 14. The system 10 allows test engineers or other users to create reusable code or test scripts 22 that can be executed while unattended by a user. As mentioned above, the system 10 includes a test tool 21 that executes on a test development computer 12, which communicates with an agent 36 executing on the target device 14, wherein the target device is the device that contains the Application Under Test (AUT) 37. The test tool 21 includes a test-tool application program 39 and a test language application program interface (API) 40. The test language API 40 is a set of routines used by the test-tool application program 39, which provide a test developer with the needed functionality to perform testing and validation of the AUT 37.

In one embodiment, the test language API 40 along with the test scripts 22 are designed to run in the Microsoft™ Visual Basic development environment. However, it will be understood by those of ordinary skill in the art that the automated-test-system functionality disclosed herein could readily be developed using other high level languages as well. The functionality provided by the test language API 40 centers around the windows and window controls that make up the GUI of the AUT 37. In one embodiment, the test language API 40 includes a logging manager 41, a barcode manager 43, a screen definition manager 45, a configuration manger 47, and a trap manager 49. Relevant aspects of these systems and the functionality they provide will be described in detail below.

The logging manager 41 is an API set that enables the user to create and view a log file, which contains test execution information. This information can include errors, warnings, trap info, debug info, informational messages, etc. In one embodiment, the log file includes a column, "Message Type," which indicates the type of message for each message logged. When a call is made to the logging manager 41 to write a message to the log file, the call contains a parameter that indicates the message type (e.g., "INFO_LOG," "WARNING_LOG," "ERROR_LOG," "SYSTEM_LOG," "TRAP_LOG," etc.). If the logging manager 41 is enabled in general, and the logging of that particular message type is enabled, then the message along with the message type will be entered in the log file. Data associated with the logging manager 41 can be stored in a logging database 42, which, in one embodiment, resides on the development PC 12. The logging manger 41 includes a number of related methods or functions that provide a user with control over what information is placed in the log file. For example, one such method allows a user to enable (or disable) all logging performed by the logging manger 41. Another method allows the user to enable (or disable) logging for each specified message type mentioned above. Advantageously, the log file can therefore contain any combination of message types desired by the user, including, for example, a mix of error messages, warning messages, and informational messages.

The logging manager 41 also enables a tester to view only those message types that he/she would like to see. To provide this capability, the test tool 21 includes a log viewer which allows a user to filter a log file based on one or more message types. Error and warning messages may include screen comparison/expected value information. A bitmap "snapshot" of a screen on the target device 14 can be written to a log file. This information can be viewed by a user while a test script 22 is running or after the test has completed to determine whether any "bugs" were encountered. The log viewer, accessed through a test tool interface, was designed to help a test developer view any log files created by them or the test system 10. The log viewer also allows the user to view specific errors or warnings based on an error or warning number. In one embodiment, a default system log can always be open to receive all messages the test developer creates as well as all system level logging information. The default system log is created during a test initialization phase. Preferably, to prevent loss of this information, this log cannot be deleted using any of the methods or functions associated with the logging manager 41.

Continuing with FIG. 2, in one embodiment, the test language API 40 can include a barcode manger 43 for testing certain applications 37 on a target device 14. For example, the barcode manger 43 would be especially advantageous for testing an application on a Delivery Information Acquisition Device (DIAD) used by a package delivery company like the assignee of the subject invention, UPS, Inc. In such cases, a test developer is likely to encounter a need to better handle barcode generation in their test scripts 22. Using the barcode manager 43, a test developer can simulate the scanning of a barcode label with the target device 14 based on a list of criteria that define the type of label to be scanned. This list of criteria can identify things such as region, service class, features, etc. By accessing a barcode table database 44, the barcode manger 43 can be used to query the database for labels which meet the set of criteria defined in a test script 22. The barcode manager 43 can also tell the test developer information about features of a given label. Using the barcode label feature information, the test developer can verify that the application under test 37 is handling the label correctly.

The trap manager 49 is responsible for "trapping" and handling the occurrence of unexpected screens (or "trap events") that can appear on the target device 14 during execution of an automated test. The ability to handle unexpected screens, message boxes or other such events can be an important aspect of conducting the unattended execution of automated tests. When creating a test script 22 which is designed to dictate a series of events that occur during an automated test, a test developer typically expects events to occur in a certain order so that he or she can effectively test particular aspects of the AUT 37. For the most part, the test developer is able to control the sequence of events via the commands in the test script 22. However, it is not uncommon to have trap events such as unexpected screens pop up, which can adversely impact the automated test, even causing it to fail.

As referred to herein, these unexpected and potentially adverse screens are called "trap events." Such unexpected windows (or trap events) that appear on the target device 14 can be generated by either the AUT 37, another application executing on the target device, or the operating system (OS) 35. For example, if an application such as Microsoft Outlook is running in the background on the target device 14, it may cause an unexpected message box to pop up during an automated test. Or, a network that the target device 14 is connected to might send out an unanticipated message saying that a particular server went down. Therefore, a system needs to be in place to allow a user to handle "trap events" or unexpected windows that can be generated by the AUT, any other application, or the OS on the target device 14.

To accomplish this, the trap manager 49 allows a user to define a list of screens to trap, what functions to call when each such screen appears, and a list of arguments to send to the function which handles the trap event. This is referred to as registering a trap. The data that defines each registered trap event can be stored in a trap event database 50. Trap definition data can be stored on the development PC 12 and/or on the target device 14. Before the test tool 21 performs screen verification, keyboard movement, mouse movement, etc., the test tool via the agent 36 checks to see whether any of the user-defined screens that are registered as traps are open on the target device. If so, the test tool 21 executes the appropriate user-defined function or block of code, which has been created by the user to handle each such trap event. In other words, the trap manager 49 keeps a list of windows and controls for which traps are defined. Any trap that has been defined has an associated function to handle that trap event. Whenever a trapped window or control attribute matches the trap definition, the defined function is executed using the arguments the test developer has supplied.

In one embodiment, a trap table can be stored on the target device 14. The trap table includes a list of all screens for which traps have been registered. For each registered trap, the trap table includes a user-defined trap name along with whatever information is needed to identify the window or control associated with that trap. Any time the test tool 21 makes a call over to the agent 36, the agent automatically runs through the list of traps in the trap table to determine whether any of the trap screens have popped up on the target device 14. If a trap event is detected by the agent 36 during this process, the agent can send the name of the trap to the test tool 21 on the development PC 12. Using the name of the trap event detected by the agent 36, the test tool 21 can access a table on the development PC 12 that contains a list of pointers, referenced by trap name, which point the test tool to a block of code, which is the user-defined function for handling an occurrence of each particular trap event. As with other executable portions of a test script 22, the test tool 21 ultimately carries out some of the instructions in the trap-related function by making appropriate requests to the agent 36. Such requests can include sending instructions to perform one or more keyboard or mouse movements that cause the open screen to close, for example.

The trap manager 49 has several methods defined that allow a test developer to register a trap, delete a registered trap or delete all registered traps. The trap manager 49 also has a method that allows a user to explicitly test for registered traps. Messages can be logged to a system created trap log. Typically, a message is written to the trap log every time a trap is registered, deleted, or executed. The trap manager 49 can also have a counter which keeps track of how many times a registered trap has been executed.

In general, the trap manager 49 enables a test developer to perform certain functions when a predefined event occurs. The test developer is able to trap events such as the appearance of an application window, system window, message box, etc. The test developer can also trap against attributes of a control or window. The test developer could therefore set a trap for when a specific control gains the input focus, becomes active, becomes visible, changes to a new screen position, changes size, etc. Several generic trap routines are defined to handle the traps. For example, a trap routine to make a window close is supplied. A trap routine to keep a count of how many times the trap condition occurred is also supplied. The test developer can also call a routine to pause execution of the test when a trap condition occurs. Another trap routine allows the user to log a message to the trap log and/or a specific logging file when a certain window condition is met. Every registered trap typically has a counter associated with it. This counter keeps track of how many times this trap has been executed.

Figure 3:
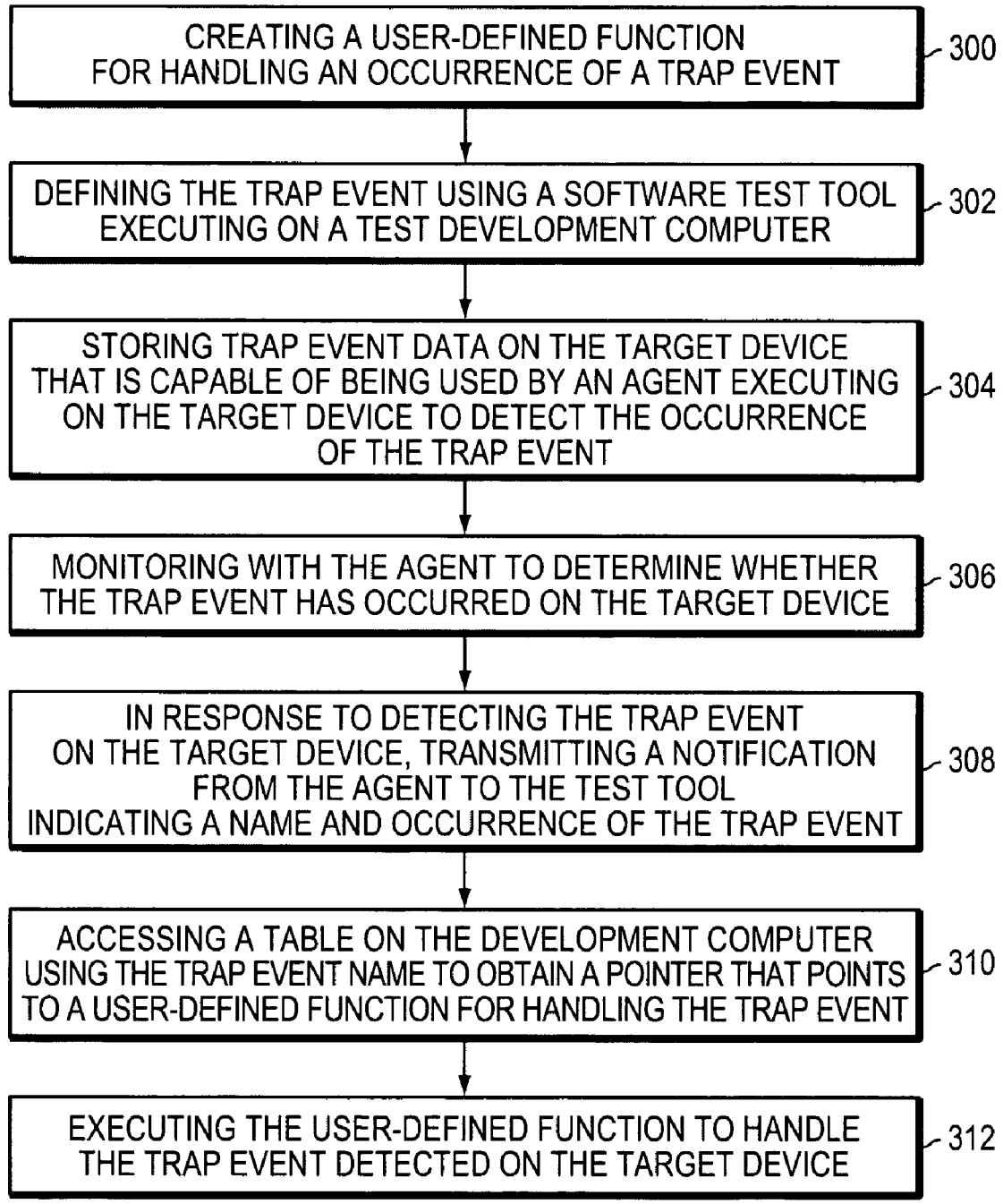
FIG. 3 is a flow diagram that illustrates a sequence of steps for handling a trap event that occurs during execution of an automated test, in accordance with the present invention.

FIG. 3 is a flow diagram that illustrates a sequence of steps for handling a trap event that occurs during execution of an automated test, in accordance with the present invention. At step 300, a test developer creates a user-defined function for handling an occurrence of a trap event. This function can include any sequence of instructions that the test developer deems appropriate for handling the particular trap event. At step 302, the test developer or other user defines the trap event using the software test tool 21 that is executing on the test development computer 12. Trap events can be defined using the capabilities of the test tool 21 in connection with the trap manager 49, as described above. At step 304, data associated with the trap event is stored on the target device, and at step 306 the agent monitors events on the target device 14 to determine whether the trap event has occurred. To prevent the trap event from adversely impacting the expected flow of a test script 22, the agent 36 can check for the trap event before the test tool 21 (via the agent) performs another operation such as screen verification, keyboard movement, mouse movement, etc.

When the agent 36 does in fact detect the trap event on the target device 14, then at step 308 the agent transmits a notification to the test tool 21 which includes the user-defined name of the trap event and the fact that it has occurred. At step 310, the test tool 21 uses the name of the trap event to access a table on the development computer 12 to obtain a pointer that points to the corresponding user-defined function that was created to handle this trap event. At step 312, the test tool 21 executes the user-defined function to handle the trap event detected on the target device 14. In doing so, the test tool 21 transmits any necessary instructions to the agent 36 in a manner as described above. After the trap event has been handled, normal execution of the test script 22 is free to resume from where it left off immediately prior to the trap event being detected.

Referring again to FIG. 2, the screen definition manager 45 enables the automated test system 10 to match currently displayed screens on the target device 14 to a specific definition of a screen. This in turn enables test developers to verify that every screen on the target device 14 is displayed according to an expected state. The screen definition manager 45 also supplies the test tool 21 with information required to communicate via the agent 36 with the application's 37 windows and controls, through the Windows messaging system. The screen definition information can be stored in a screen definition table or file 46. The test tool 21 provides one or more functions that allow a user to edit the screen definitions contained in the screen definition table (or file) 46. Each release of an application 37 can have its own screen definition table 46 to match the specific set of screens that accompany that release. The screen definition table 46 is also linked to the configuration manager 47 to accommodate internationalized string information to support multiple language releases. The configuration manger 47 is described in detail below.

More specifically, the screen definition manger 45 is responsible for mapping window names to window definition information. Functionally, there are two parts to the screen definition manager 45. There is a language support system part and a window definition recorder/creator part. The language support system is used internally to query for information which uniquely identifies a screen or control on the target device 14. This information can be used by other systems to, for example, identify what screen is currently being displayed, get a "handle" to a control or screen to allow interaction with that control or screen, and trigger a "trap" defined for a screen, as described above.

The window definition recorder/creator part is used to create the screen definition table 46 to be used by the language support system. The screen definition manger 45 provides the test system 10 with the capability to compare screens on a control by control and attribute by attribute level. For a given control located on the target device 14, the test tool 21 via the agent 36 can validate control's position, size, class, windoID, caption text, text color, font name, font size, font boldness, font italics, font underlined, font strikeout, text background mode (opaque or transparent), window style, extended window style, "HasFocus," "IsActive," "IsEnable," "IsVisible," etc. The use of these properties to "identify" and "verify" screens or controls on the target device 14 is described in detail below.

Continuing with FIG. 2, the configuration manager 47 provides a robust system for testing against multiple languages and platform configurations. The ability to test international releases can be an important capability for many test groups. Testing of international releases requires the ability to define configuration items. These configuration items can define the behavior of the application 37 when running for a specific country or platform configuration. In one embodiment, configuration variables can be stored in a configuration table 48, which can be stored in an Excel spreadsheet. This provides an easy-to-use format for a test developer that allows configuration items and their corresponding values to be dynamically created. The configuration manager 47 can be used for any application 37, which supplies a user-defined set of configuration variables.

The configuration manager 47 includes several configuration-related methods or functions that can be used by a test developer. For example, the configuration manager 47 has a method to load configuration information during test initialization. The configuration manager 47 also has a method to load the current value of a configuration item. Program flow of a test script 22 can then be controlled based on the value of a configuration item by the PC 12 as it executes the test script. This feature allows the test developer to define segments of code in the test script 22 that may or may not be executed based upon the value of a configuration item. Functionality is also provided to allow the test developer to easily reload configuration items if a change has been made. The configuration manager 47 also controls the screen definition manager 45. When the PC 12 initializes configuration items, it loads the corresponding screen definitions according to items defined in the configuration table 48.

The configuration table 48 is basically a categorized collection of name-value pairs. As noted above, in one embodiment, the configuration table 48 can be stored in a spreadsheet format for ease of editing by a user. As illustrated by FIGS. 4A-4C, the configuration table 48 can include a plurality of configurations 64, wherein each configuration is a collection of value sets 60, and each value set is a collection of configuration items 66 and their corresponding values 68. The test tool 21 allows a user to name all item groups 62, value sets 60 and configuration items 66 so that the user may build these items with names that are meaningful within such user's testing environment.

FIG. 4A shows a representative portion of an example configuration table 48 which defines the value sets 60 to load from each item group 62 for each configuration 64, in accordance with the present invention. The example of FIG. 4A shows a number of configurations 64 including "FR2," "FR3," "GB2," "GB3," "US2," etc. For each configuration 64, a value set 60 is defined for each item group 62. The item groups 62 shown in FIG. 4A include "Global," "Country," "Language," and "DIAD," where in this particular example "DIAD" is the item group used to identify the platform configuration associated with the AUT 37 running on the target device 14. If a given configuration 64 is loaded by the test tool 21, then each of the corresponding value sets 60 associated with that configuration are loaded as well. For example, if the configuration "US3" is loaded during test initialization, the test tool 21 begins operation using the following value sets 60: "Standard" from the "Global" item group; "US" from the "Country" item group; "en_US" from the "Language" item group; and "D3" from the "DIAD" item group. After test initialization, if a test developer changes one of the value sets 60 during execution of a test script 22, then the test tool 21 is programmed to automatically reload ("on the fly") all values associated with the value set to which the test developer changed.

FIG. 4B shows a representative portion of the example configuration table 48 which defines the value sets 60 that fall into a particular item group 62, in accordance with the present invention. Each value set 60 includes a plurality of configuration items 66 along with associated values 68. In this example, the item group 62 is "Language," and the value sets 60 are "en_GB," "en_US," "fr_FR," and "it_IT," which correspond to English (Great Britain), English (US), French and Italian. According to the example of FIG. 4B, the key which represents an affirmative response ("lanYES") can have a value 68 of "Y," "O," or "S." If we return to the previous example of loading the configuration "US3," then it can be understood from looking at FIG. 4A that the "en_US" value set 60 is the value set that would be loaded from the "Language" item group 62.

Continuing with this example, FIG. 4C shows the value set 60, including language-related configuration items 66 and associated values 68, that would be created by the test tool 21 as a result of loading the configuration "US3." When writing a test script 22, a test developer can use one or more of the configuration-related commands mentioned above to get the language-appropriate value 68 associated with a configuration item 66. For example, if the test tool 21 is operating with the configuration "US3," the value 68 of "ianYES" is "Y." Therefore, the test developer does not need to code specific values 68 into a test script 22 to handle each language. This allows the test developer to define segments of code in the test script 22 that may or may not be executed, as the developer chooses, based upon the value 68 of a configuration item 66. Furthermore, if a language-specific key changes, the key can be changed in the configuration table 48, which is loaded at the beginning of every test.

Figure 5:
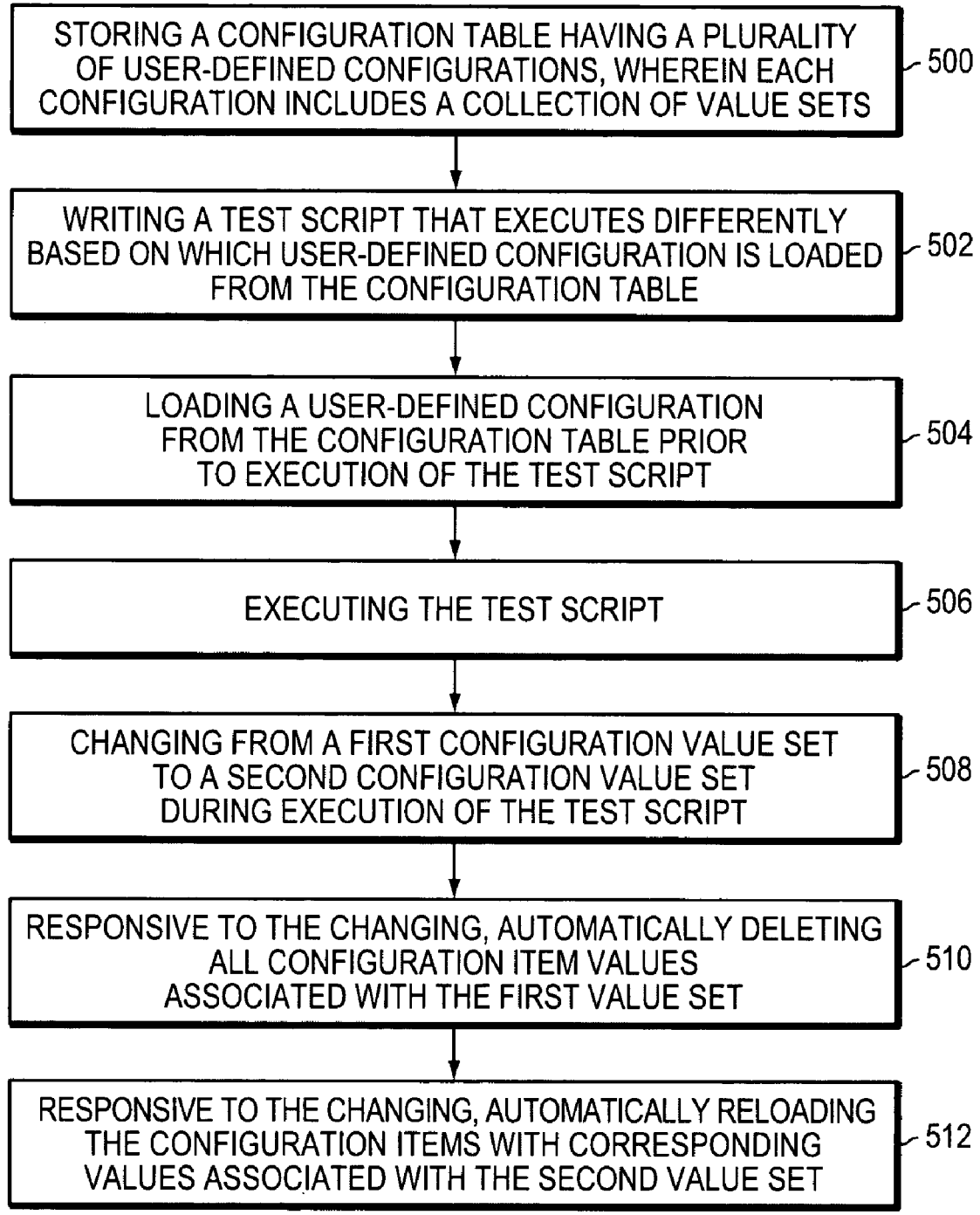
FIG. 5 is a flow diagram that illustrates a sequence of steps for testing an application which is operable to execute in multiple languages and platform configurations, in accordance with the present invention.

FIG. 5 is a flow diagram that illustrates a sequence of steps for testing an application 37 which is operable to execute in multiple languages and platform configurations in accordance with the present invention. At step 500, a configuration table 48 having a plurality of user-defined configurations 64 is stored in a location accessible by the test tool 21. Each configuration 64 in the configuration table 48 includes a collection of value sets 60. Each value set 60 includes a collection of one or more related configuration items 66 and associated values 68. At step 502, a test developer or other user writes a test script 22 that executes differently based on which user-defined configuration 64 is loaded from the configuration table 48. As mentioned above, having access to configuration values 68 allows test developers to define segments of code in their test scripts 22 that may or may not be executed, as the programmer determines, based upon the value 68 of a configuration item 66. At step 504, a user-defined configuration 64 can be loaded from the configuration table 48 prior to execution of the test script 22, and at step 506, the test script can be executed using the test tool 21.

At step 508, the process can continue if during the execution of the test script 22 the user changes from a first configuration value set 60 to a second value set. For example, a test script 22 may call for the "Language" value set 60 to be changed from "en_US" to "fr_FR" (See FIG. 4B). If this were to occur, then in response to this change, the test tool 21, at step 510, knows to automatically delete all values 68 defined for the configuration items 66 associated with the first value set 60, and, at step 512, the test tool 21 automatically reloads the configuration items 66 with the corresponding values 68 that are associated with the second value set 60 to which the user has changed. The capability to dynamically change from one value set 60 to another during execution of a test script 22 allows a test developer to test the AUT 37 against multiple languages and platform configurations during a single automated test.

In addition to the capabilities described above, the automated test system 10 includes many other features that provide test developers with greater flexibility and convenience when writing test scripts 22. For example, in one embodiment the test tool 21 allows a user to assign an input event name to a grouping of multiple key sequences. The grouping of multiple key sequences can represent an input event that occurs on the target device 14 during execution of a test script 22. The user-defined input event name can then be used in place of the grouping of multiple key sequences each time a test developer has a need to write that grouping into a test script 22. In addition to being more convenient for the developer writing the test script 22, it can also increase (for a reader of the test script) the clarity of events which are meant to take place. This feature can be particularly advantageous when dealing with frequently performed input events that would typically require numerous test instructions to perform what is functionally a single event. An example of this might be a simulated input event on the target device 14 that involves a need to press and hold multiple keys simultaneously, and then release each of the keys (e.g., defining a name such as "open_task_manager" to "ctrl-alt-delete" on a Windows PC).

The test tool 21 also includes a number of other capabilities that can be used in connection with performing simulated key presses, mouse movements, etc. on the target device 14. For example, the test tool 21 includes a "delay" event, which defines how many milliseconds to wait after executing a given action. A test developer using the test tool 21 can write a single test command that includes pressing a sequence of keys (e.g., spelling out a certain word), waiting a certain amount of time (e.g., 1000 milliseconds) after pressing such keys, and then pressing the enter key. A command such as this would cause this actual sequence of events to take place in real time on the target device 14. The test tool 21 further includes a "check-for-screen" event, which can be used to check whether a specified screen exists on the target device 14. If it is determined that the screen exists, the test tool 21 will continue processing the events in the current call, otherwise it will abort the call. For example, a call can be made to first press a particular key within a given screen on the target device 14 and then check to see if an expected screen exists. If the screen does exist, the test tool 21 via the agent 36 can proceed with the next part of the call (such as pressing additional keys), but if the screen does not exist, the test tool can abort the call.

The test tool 21 also provides test developers with an extremely flexible system for "identifying" and "verifying" screens or controls that are present on the target device 14.

Suppose a test developer wants to make a call to get the text from a specific text box on the target device 14, for example. Before the test tool 21 can "grab" the specific control (via the agent 36), the test tool needs to find that control. To be able to find that control, the test tool 21 needs to know some information about what that control looks like and what screen it appears in. To accommodate this process, the test tool 21 includes a screen definition table (or file) 46, as mentioned above.

FIG. 6 shows an example of the type of information found in a screen definition table 46, in accordance with the present invention. The screen definition table (or file) 46 contains information that is used to define each screen, and each control within each screen, that is associated with the Graphical User Interface of the AUT 37. The screen definition table 46 can include a user defined name (i.e., "control path") 72 for uniquely referring to each control listed in the table, a "class name" property 74 for indicating the class type to which each control belongs (e.g., "dialog," "static," "listbox," "button," etc.), and a plurality of other properties 76 that further define each control. Note that FIG. 6 is meant only to illustrate a sampling of the properties 76 that can be used to define a control associated with the AUT 37. Additional properties 76 that can be found in a screen definition table 46 include a control's height, width, extended windows style, font type, whether the font is bold, italics or underline, background color, text color, etc.

The screen definition table 46 also includes an "Identify Flag" data field 78 for optionally storing a control-specific identify flag 79. The control-specific identify flag 79, if defined, is used for indicating which properties are to be selected if "identifying" (on the target device 14) the particular control with which that flag is associated. Similarly, the screen definition table 46 also includes a "Verify Flag" data field 80 for optionally storing a control-specific verify flag 81. The control-specific verify flag 81, if defined, is used for indicating which properties are to be selected when "verifying" that the particular control with which the flag is associated matches an expected state. An expected state for a given control is based on the manner in which a list of one or more properties are defined for the given control in the screen definition table 46. It should be pointed out that the control-specific identify flag 79 and the control-specific verify flag 81 are independent of each other. In other words, whether or not one of these flags is defined in table 46 does not dictate whether the other is defined (or not) as well. The user is free to define (or not) each flag independently of the other.

The "Identify Flag" data field 78 and the "Verify Flag" data field 80 allow a user of the test tool 21 to customize, for each individual control, a specific set of properties that are to be used when "identifying" or "verifying," respectively, each such control on the target device 14. If these fields are left blank by the user, as shown for many of the controls in FIG. 6, then the test tool 21 knows to use a default set of properties when "identifying" or "verifying" a given control on the target device 14. As described in detail below, the default sets of properties are defined by default identify flags 86 and verify flags 88, which can be found in a second table or file that is referred to herein as a "class mapper" file (or table) 82.

It should be understood that all "identify flags" and "verify flags" are basically bit masks, wherein each binary bit corresponds to a control property found in the screen definition table 46. In this way, each binary bit can be used to indicate whether or not that given control-related property should be used in the process of "identifying" (or "verifying") a control on the target device 14. Depending on the convention used, either a "1" or a "0" in each bit position indicates to the test tool 21 whether or not that control-related property (corresponding to that bit position) should be used as one of the properties that are compared during the process of identifying or verifying a given control. If identifying (or verifying) a given control on the target device 14, the control properties indicated in the above-mentioned flags are the properties for which the test tool 21 (via the agent 36) compares the actual property values of the control on the target device, to the corresponding expected values of the control, as defined in the screen definition table 46.

FIG. 7 shows the type of information that would be contained in a class mapper file 82 in accordance with the present invention. The class mapper file (or table) 82 includes a list of different GUI control class types 84, which can be associated with the AUT 37 running on the target device 14. A default identify flag 86 and a default verify flag 88 is associated with each class type 84. As indicated above, when an instruction in a test script 22 requires the test tool 21 to identify a control on the target device 14, the test tool uses the user-defined name 72, included in the test instruction, to locate a corresponding entry in the screen definition table 46 that is associated with that control. In addition to reading the properties associated with that control, the test tool 21 checks to determine whether the "Identify Flag" data field 78 is empty. If the Identify Flag data field 78 is not empty, the test tool 21 loads the control-specific identify flag 79 from the data field 78 in the screen definition table 46. However, if the field 78 is empty, then the test tool 21 automatically uses the class name 74 associated with that control to obtain the corresponding default identify flag 86, which is contained in the class mapper file 82.

To further illustrate this point, consider the following example. The first control listed in the table of FIG. 6 has a user defined name 72 of "DUP_LABEL." This is the name 72 that a test developer would use in a typical test script instruction that involves this control. As shown in FIG. 6, the Identify Flag data field 78 associated with this control ("DUP_LABEL") is empty. Therefore, the test tool 21 automatically uses the class name 74 associated with this control (i.e., "dialog") to get the default identify flag 86 from the portion of the class mapper file 82 marked "dialog." According to the class mapper file 82 of FIG. 7, the default identify flag 86 used for identifying "dialog" controls has an integer value of "5120." When converted to a binary number, this "5120" value reveals to the test tool 21 a list of one or more properties that are to be used in identifying this control. Using this list of properties, the test tool 21 via the agent 36 can compare the actual values of these properties for a control on the target device 14, to the corresponding expected values of these properties as defined in the screen definition table 46.

Similarly, if a user wanted to "verify" how a window (or control) is being displayed on the target device 14, the test tool 21 follows the same process described above to find the window on the target device. Assuming the window was found, the test tool 21 via the agent 36 requests the properties associated with that window. As described above, the test tool 21 uses the verify flag 81 (or 88) to determine which properties to use when verifying the window. For these properties indicated in the verify flag 81 (or 88), the actual property values of the window on the target device 14 are compared to the corresponding property values as defined for that window in the screen definition table 46. If any property is found not to match, then an error would be raised and a corresponding entry can be made to a log file detailing the mismatch.

Figure 8:
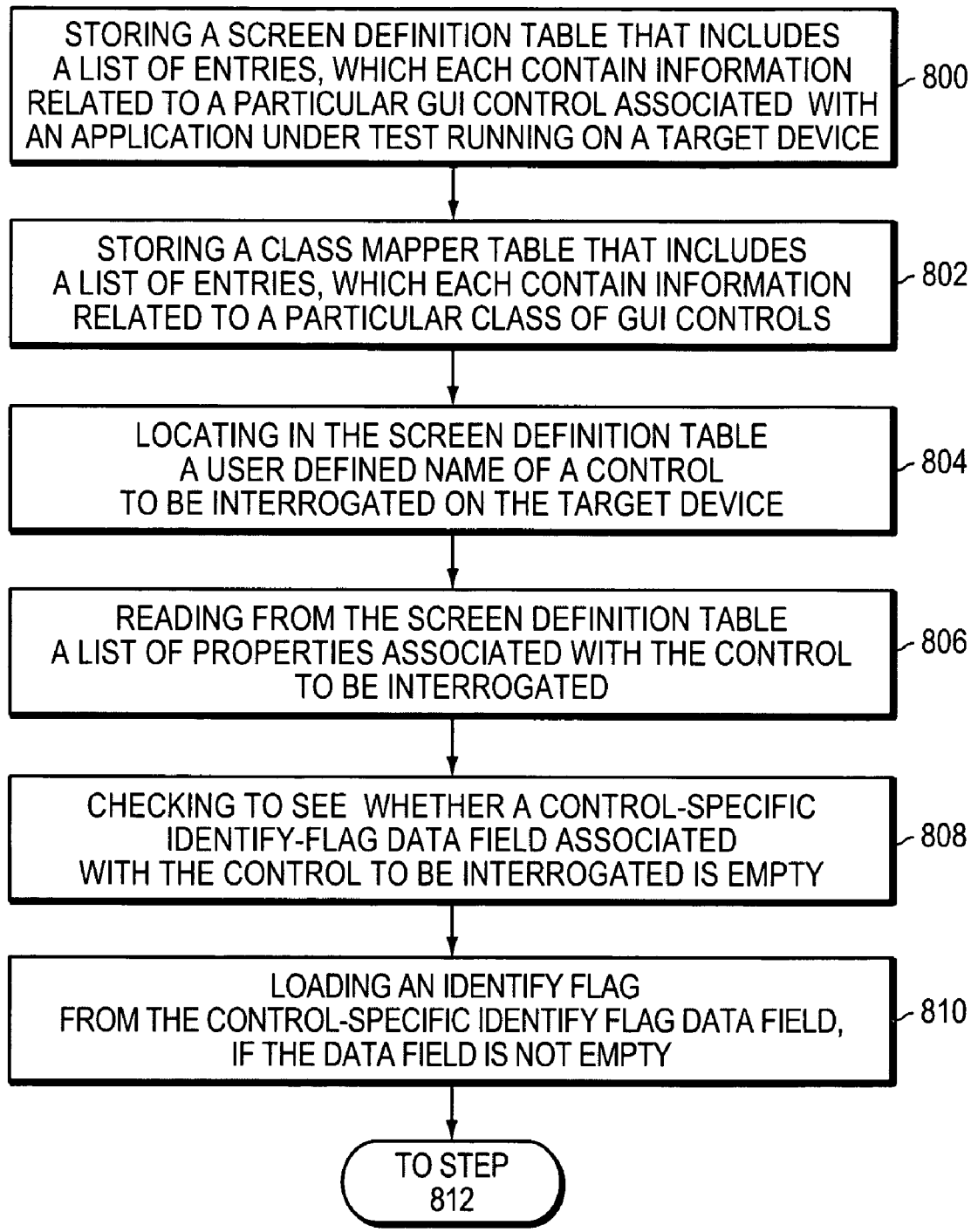
FIGS. 8-10 are flow diagrams that illustrate a sequence of steps for interrogating a control that is associated with an application under test running on a target device, in accordance with the present invention.
Figure 9:
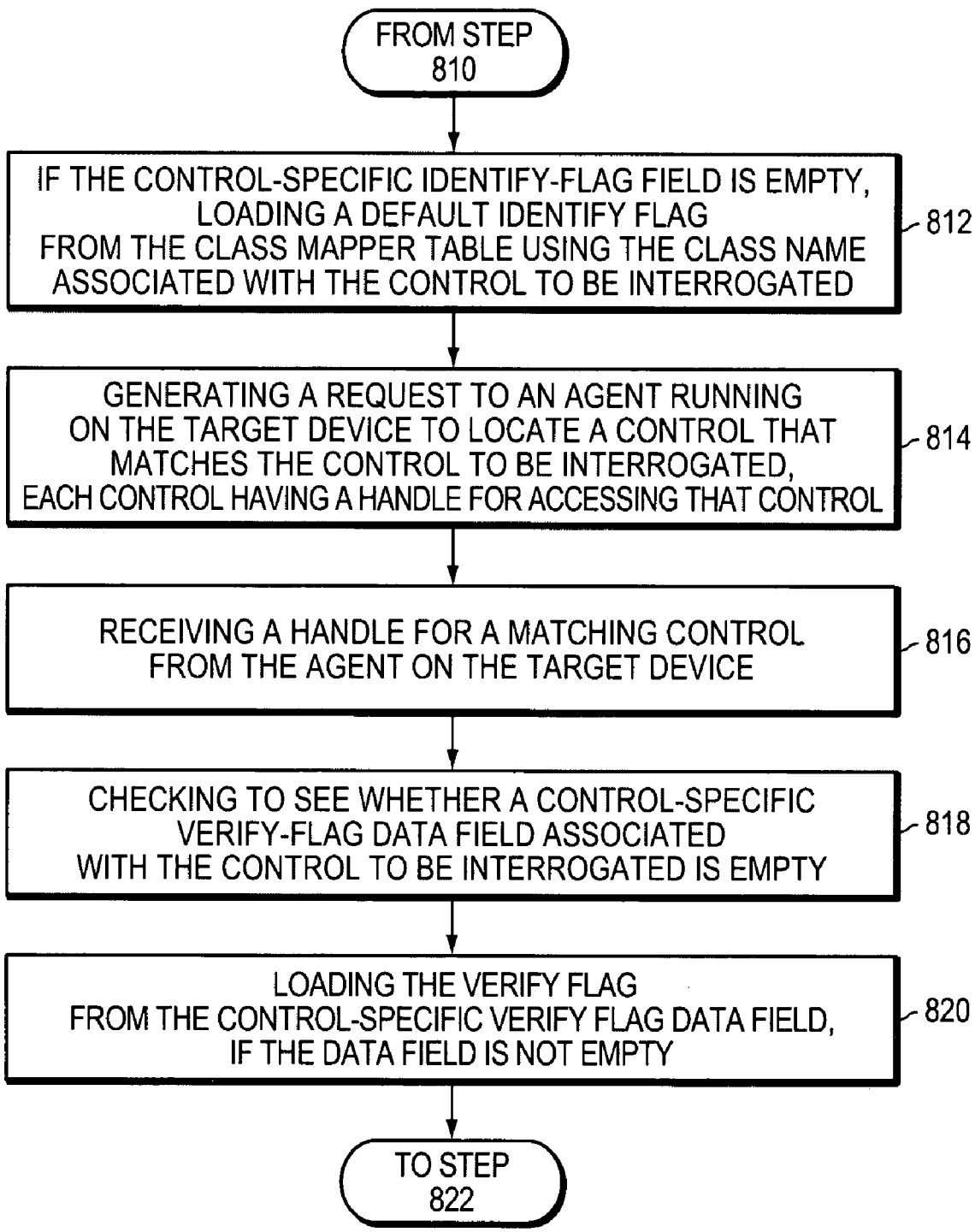
Figure 10:
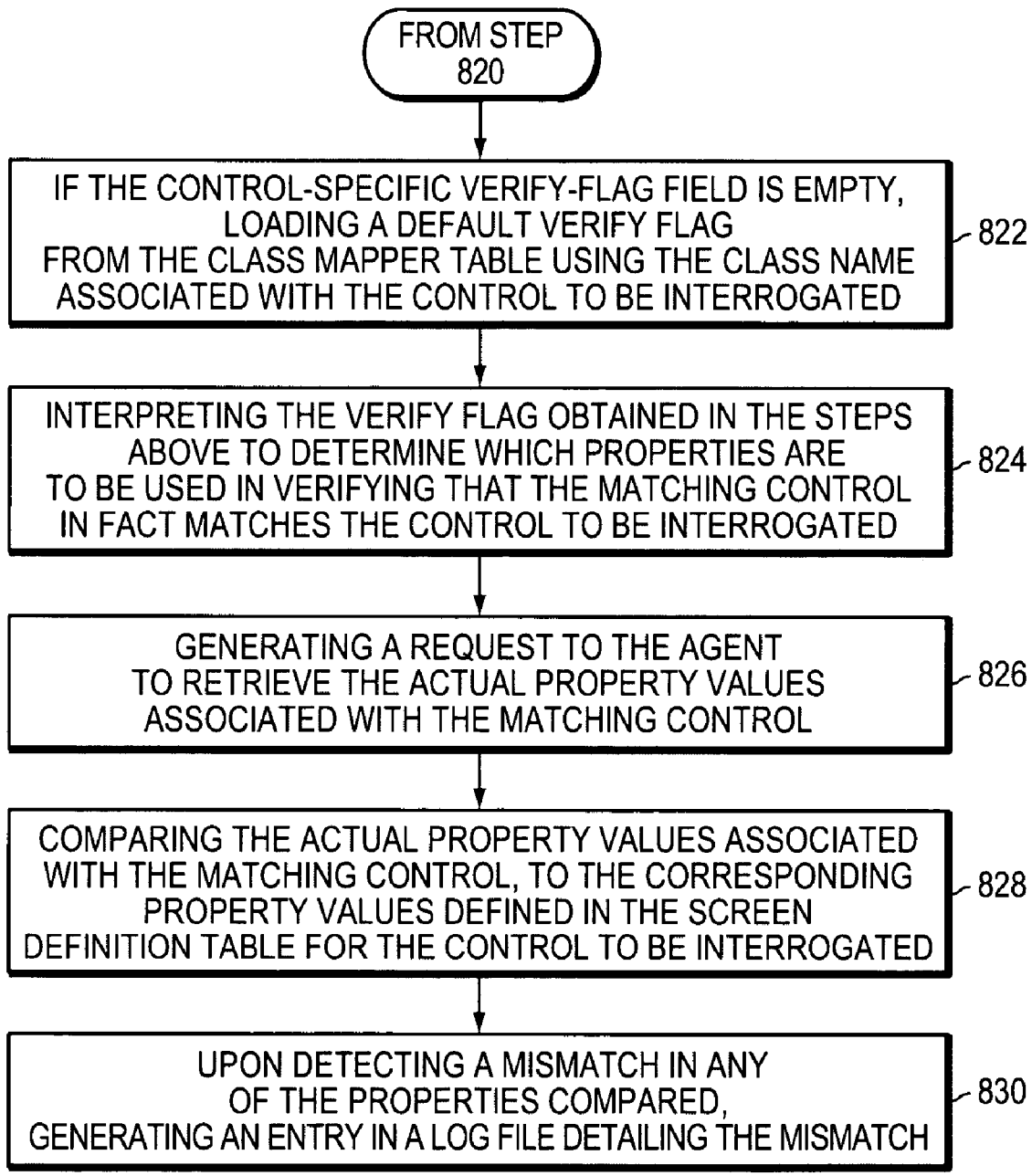

FIGS. 8-10 are flow diagrams that illustrate a sequence of steps for interrogating a control (or screen) that is associated with an application under test 37 running on a target device 14, in accordance with the present invention. At step 800, a screen definition table 46 is stored in a location accessible by the test tool 21. Each entry in the screen definition table 46 contains information that is related to a particular GUI control associated with the application under test 37. The information typically includes a user defined name 72, a plurality of control-related properties 76, including a class name 74, an "Identify Flag" data field 78 for optionally storing a control-specific identify flag 79, and a "Verify Flag" data field 80 for optionally storing a control-specific verify flag 81. At step 802, a class mapper table 82 is stored in a location accessible to the test tool 21. Each entry in the class mapper table 82 contains information related to a particular class of GUI controls, which can be utilized by the application under test 37 on the target device 14. Each entry in the class mapper table 82 includes a class name 84 for referring to that class of controls, and a default identify flag 86 and a default verify flag 88 for, respectively, identifying and verifying controls of that class type, which do not have associated with them a control-specific identify flag 79 or verify flag 81.

At step 804, the test tool 21 locates in the screen definition table 46 the user defined name 72 of the control to be interrogated on the target device 14. Assuming the control is located in the screen definition table 46, at step 806 the test tool 21 reads a list of properties associated with that control. The test tool 21 also checks to see whether the control-specific identify-flag data field 78 for that control is empty, at step 808. If the Identify Flag data field 78 is not empty, the test tool 21 loads the control-specific identify flag 79 from the data field, at step 810. However, turning to FIG. 9, if the control-specific identify-flag data field 78 is empty, then at step 812 the test tool 21 loads a default identify flag 86 from the class mapper file 82, using the class name 74 associated with the control to be interrogated.

At step 814, the test tool 21 generates a request to the agent 36 to locate a control that matches the control to be interrogated. The agent 36 locates a "matching" control by searching for a control on the target device 14 that has a set of properties (which are those properties indicated by the identify flag 79 (or 86) obtained in the steps above) that match the corresponding set of properties for the control to be interrogated. Each control on the target device 14 has associated with it a "handle" or identifier that can be used by the test tool 21 (via the agent 36) to access properties associated with that control. If the agent 36 locates a control that matches the control to be interrogated, the agent can return the handle of such control to the test tool 21, which is received at step 816.

If an automated test calls for verifying the control to be interrogated, then at step 818 the test tool 21 checks to determine whether the control-specific verify flag data field 80 is empty. At step 820, the control-specific verify flag 81 is loaded from the data field 80 if the test tool 21 determines that the field is not empty. However, turning to FIG. 10, if the control-specific verify flag data field 80 is empty, then at step 822 the test tool 21 loads a default verify flag 88 from the class mapper file 82, using the class name 74 associated with the control to be interrogated. At step 824, the test tool 21 interprets the verify flag 81 (or 88) obtained in the steps above to determine which properties to use in verifying that the "matching" control on the target device 14 in fact matches the control to be interrogated.

At step 826, the test tool 21 generates a request to the agent 36 to retrieve the actual property values, for at least the properties indicated in the verify flag 81 (or 88), that are associated with the matching control. For only those properties indicated in the verify flag 81 (or 88) obtained above, at step 828, the test tool 21 compares the actual property values associated with the matching control found on the target device 14, to the corresponding property values defined in the screen definition table 46 for the control to be interrogated. If a mismatch is found in the comparison of any of such properties, then the error can be raised by, for example, generating an entry in a log file detailing the mismatch.

FIG. 11 shows a screen shot of a user interface 90 associated with the test tool 14, which currently displays several open log files 92. The test-tool user interface 90 is primarily a menu system that allows a test developer to view output generated by a test script 22 currently being run. Using the test-tool user interface 90, the test developer can perform a variety of operations, including viewing registered traps, opening log files 92, and viewing configuration files. The user interface 90 can also be used to check memory resources, active processes, view/edit a registry, view a file structure, etc on the target device 14, or to access test-tool help files on the development PC 12, for example. The user interface 90 can also be used to perform yet other operations such as detaching from the current target device 14 to connect to another such device, or accessing a test configuration screen to update active configuration selections.

Many modifications and other embodiments of the invention set forth herein will come to mind to one skilled in the art to which this invention pertains having the benefit of the teachings presented in the foregoing descriptions and the associated drawings. For example, the preferred embodiment has been described in connection with a test tool on a personal computer using a Windows-based operating system, and a target device using a Windows CE environment. It should be understood, however, that the disclosed embodiments, unless otherwise expressly limited to particular operating systems in the following claims, may be implemented on the PC 12 with operating systems comparable to Windows-based systems including Unix, Linux, Solaris, and others. Similarly, the target device 14 can execute an operating system other than Windows CE, such as Windows XP, Windows 2000, Windows NT, Palm OS or other "thin" or compact operating system, for example. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for testing an application running on a target device, the system comprising:

a target device storing and executing a software test agent, wherein said application under test is also stored and executed on said target device;

a test development computer storing and executing a software test tool for testing and validating said application's rendering of output to a Graphical User Interface (GUI), said test tool configured to communicate with said agent on said target device;

said software test tool executing a test script for testing and validating one or more aspects of said application's rendering of output to said GUI, said test tool operable to generate requests to said agent to obtain information from and send events to controls associated with said GUI;

said software test tool comprising a configuration manager for handling testing of said application against multiple languages and platform configurations;

said configuration manager comprising a configuration table having a plurality of user-defined configurations, each said configuration comprising a collection of value sets corresponding to respective configuration item groups, each said value set being one of a plurality of possible value sets that are selectable in association with said respective item group, each said value set comprising a collection of one or more related configuration items and corresponding values for said related items; and said configuration table being stored in a spread sheet format for ease of editing by said user, said spread sheet being configured for allowing said user to simultaneously view in a tabular format said plurality of possible value sets that are selectable in association with each said configuration item group wherein, in response to a user changing from a first value set to a second value set during execution of said test script, said software test tool is further configured to:

automatically delete all configuration item values associated with said first value set and reload said configuration items with corresponding values associated with said second value set; and continue executing said test script using said configuration item values associated with said second value set.

2. The system of claim 1, wherein said configuration manager comprises a capability that allows said user to get said value of a particular configuration item, and a capability that allows said user to set said value of a particular configuration item, during execution of said test script.

3. The system of claim 1, wherein said test tool comprises a capability that allows said user to assign an input-event name to a grouping of multiple key sequences, said grouping of multiple key sequences representing an input event that occurs on said target device during execution of said test script, wherein said input-event name can be used in place of said grouping each time said grouping is to be written into said test script.

4. A method of testing an application that is operable to execute in multiple languages and platform configurations, the method comprising:

storing a configuration table in a spread sheet format for ease of editing by a user having a plurality of user-defined configurations, each configuration comprising a collection of value sets corresponding to respective configuration item groups, each said value set being one of a plurality of possible value sets that are selectable in association with said respective item group, each said value set comprising a collection of one or more related configuration items and corresponding values for said related items, and said spread sheet being configured for allowing said user to simultaneously view in a tabular format said plurality of possible value sets that are selectable in association with each said configuration item group;

writing a test script that executes differently based on which user-defined configuration is loaded from said table;

loading a user-defined configuration from said configuration table prior to execution of said test script; and executing said test script in accordance with said configuration loaded from said configuration table wherein, in response to changing from a first value set to a second value set during execution of said test script:

automatically deleting all configuration item values associated with said first value set;

automatically reloading said configuration items with corresponding values associated with said second value set; and continue executing said test script using said configuration item values associated with said second value set.

5. A method performed by a test development computer storing and executing a test tool operable to communicate with a target device storing and executing a test agent to interrogate a particular Graphical User Interface (GUI) control that is associated with an application under test running on said target device, the method comprising:

storing a first table that comprises a list of entries accessible by said test tool, each said entry containing information corresponding to a particular GUI control associated with said application under test, said information associated with said particular GUI control comprising:

a user-defined name for uniquely referring to said control;

a plurality of properties which define said control, including a class name that indicates a class type to which said control belongs; and a data field for optionally storing a control-specific identify flag to be used by said test tool for indicating to said test agent that a specific set of properties are to be used in identifying said control on said target device; and storing a second table that comprises a list of entries accessible by said test tool, each said entry containing information related to a particular class of GUI controls associated with said application under test, said information associated with each said particular class of GUI controls comprising:

a class name for uniquely referring to said particular class of controls; and a default identify flag to be used by said test tool for indicating to said test agent that a default set of properties are to be used for identifying controls of said particular class of controls on said target device that do not have a control-specific identify flag associated with them, as defined in said first table.

6. The method of claim 5, further comprising:

locating in said first table said user defined name of said control to be interrogated;

reading from said first table said properties associated with said control to be interrogated;

checking to see whether said the control-specific identify-flag data field associated with said control is empty;

loading said the identify flag from said control-specific identify flag data field, if said data field is not empty;

if said control-specific identify-flag field is empty, loading sai default identify flag from said second table using said class name associated with said control to be interrogated;

generating a request to said agent to locate a control on said target device that matches said control to be interrogated, said agent locating a matching control by searching for a control which has a set of properties indicated by said identify flag obtained in said steps above that match said corresponding set of properties for said control to be interrogated, said matching control having a handle for accessing said control associated therewith; and receiving said handle for said matching control from said agent.

7. The method of claim 6, wherein said entry associated with each said control listed in said first table further comprises a data field for optionally storing a control-specific verify flag, said control-specific verify flag used for indicating that a specific set of properties are to be used when verifying that an occurrence of said control on said target device matches an expected state; and wherein said entry associated with each said class of controls listed in said second table further comprises a default verify flag, said default verify flag used for indicating that a default set of properties are to be used for verifying controls of said particular class of controls on said target device that do not have a control-specific verify flag associated with them, as defined in said first table.

8. The method of claim 7, further comprising:

checking to see whether said control-specific verify-flag data field associated with said control to be interrogated is empty;

loading said verify flag from said control-specific verify flag data field, if said data field is not empty;

if said control-specific verify-flag field is empty, loading said default verify flag from said second table using said class name associated with said control to be interrogated;

interpreting said verify flag obtained in said steps above to determine which properties are to be used in verifying that said matching control matches said control to be interrogated;

generating a request to said agent to retrieve actual property values associated with said matching control, said values retrieved comprising values for at least those properties indicated in said verify flag obtained in said steps above; and comparing said actual property values associated with said matching control, for only those properties indicated in said verify flag obtained above, to said corresponding property values defined in said first table for said control to be interrogated.

9. The method of claim 8, further comprising:

upon detecting a mismatch in any of said properties compared, generating an entry in a log file detailing said mismatch.

* * * * *

UNITED STATES PATENT AND TRADEMARK OFFICE
CERTIFICATE OF CORRECTION

PATENT NO. : 7,398,469 B2
APPLICATION NO. : 10/799904
DATED : July 8, 2008
INVENTOR(S) : Kisamore et al.

It is certified that error appears in the above-identified patent and that said Letters Patent is hereby corrected as shown below:

Title Page,

Item (73), Assignee, "United Parcel of America, Inc." should read --United Parcel Service of America, Inc.--.

Column 18,

Lines 44 and 46, cancel "the".

Line 49, "sai" should read --said--.

Signed and Sealed this

Sixteenth Day of December, 2008

JON W. DUDAS
*Director of the United States Patent and Trademark Office*